US006542475B1

United States Patent
Bala et al.

(10) Patent No.: US 6,542,475 B1
(45) Date of Patent: Apr. 1, 2003

(54) METHOD AND SYSTEM FOR PROVIDING ENHANCED CALL SERVICE FEATURES AT REMOTE LOCATIONS

(75) Inventors: Srinivas Bala, Dayton, NJ (US); Yihsiu Chen, Middletown, NJ (US); Mark Jeffrey Foladare, Kendall Park, NJ (US); Kathleen C. Fowler, Wall Township, Monmouth County, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/370,766

(22) Filed: Aug. 9, 1999

(51) Int. Cl.[7] ............................................ H04Q 11/00
(52) U.S. Cl. ..................................................... 370/271
(58) Field of Search ................................ 370/271, 286, 370/252, 232, 352, 401, 389–404, 906; 379/93.03, 201–219, 229, 265, 410, 114–117, 88.22, 67.1, 88.11–88.17, 442, 110.01, 230, 220–226, 368; 704/201, 270

(56) References Cited

U.S. PATENT DOCUMENTS

| 4,488,004 A | * | 12/1984 | Bogart et al. ................. 379/225 |
| 5,392,342 A | | 2/1995 | Rosenthal |
| 5,548,592 A | * | 8/1996 | Komarek et al. ............ 370/271 |
| 5,608,782 A | | 3/1997 | Carlsen et al. |
| 5,644,626 A | | 7/1997 | Carlsen et al. |
| 5,664,003 A | | 9/1997 | Foladare et al. |
| 5,703,930 A | | 12/1997 | Miska et al. |
| 5,742,596 A | | 4/1998 | Baratz et al. |
| 5,742,675 A | | 4/1998 | Kilander et al. |
| 5,742,906 A | | 4/1998 | Foladare et al. |
| 5,790,652 A | * | 8/1998 | Gulley et al. ................. 379/368 |
| 5,805,991 A | | 9/1998 | Foladare et al. |
| 5,815,554 A | * | 9/1998 | Burgess et al. ........... 379/90.01 |
| 5,841,854 A | * | 11/1998 | Schumacher et al. ........ 379/265 |
| 5,875,233 A | * | 2/1999 | Cox ............................. 379/442 |
| 5,926,530 A | * | 7/1999 | Schlossman et al. ........ 379/117 |
| 5,974,133 A | * | 10/1999 | Fleischer, III et al. ....... 379/230 |
| 5,999,609 A | * | 12/1999 | Nishimura ................... 379/201 |
| 6,049,602 A | * | 4/2000 | Foladare et al. ............. 379/265 |
| 6,094,433 A | * | 7/2000 | Kunimoto et al. ........... 370/397 |
| 6,094,479 A | * | 7/2000 | Lindeberg et al. ........... 379/220 |
| 6,147,975 A | * | 11/2000 | Bowman-Amuah ......... 370/252 |
| 6,230,133 B1 | * | 5/2001 | Bennett, III et al. ......... 704/270 |
| 6,243,423 B1 | * | 6/2001 | Sakoda et al. ............... 375/262 |
| 6,249,576 B1 | * | 6/2001 | Sassin et al. ................ 370/352 |
| 6,269,101 B1 | * | 7/2001 | Gerszberg et al. ........... 370/404 |
| 6,324,264 B1 | * | 11/2001 | Wiener et al. ............... 370/352 |
| 6,359,881 B1 | * | 3/2002 | Gerszberg et al. ........... 370/354 |

* cited by examiner

*Primary Examiner*—Kwang Bin Yao
*Assistant Examiner*—Prenell Jones

(57) ABSTRACT

A system and method for providing PBX-like functionality at a remote office location utilizes a remote office platform interposed between a data communications network and the conventional office PBX. A remotely located individual (such as a telecommuter) can "log in" to the remote office platform and, once the individual is authenticated, the platform can "push" a graphical user interface emulating a PBX station set to the remote employee's personal computer. As the individual activates the various PBX-like features (by "clicking" on a particular button on the screen) a command is returned to the remote office platform and ultimately communicated to the office PBX to affect the desired result (e.g., call transfer, hold, conference, etc.). Inbound traffic to the office PBX destined for the remote individual will be immediately forwarded by the PBX to the remote office platform to be communicated to that person's "soft phone" on the personal computer.

25 Claims, 3 Drawing Sheets

METHOD AND SYSTEM FOR PROVIDING ENHANCED CALL SERVICE FEATURES AT REMOTE LOCATIONS

TECHNICAL FIELD

The present invention relates to method and system for providing enhanced call service features at remote locations and, more particularly, to method and system for providing PBX-like functionality at any away-from-the-office location.

BACKGROUND OF THE INVENTION

During the past decade, the number of professionals that "telecommute" (i.e., work at home or other "virtual office" locations) has increased significantly. Although the proliferation of various types of computing and telephony equipment has enabled these workers to be effective, there remain a number of office-related advantages that cannot, without great expense, be duplicated at home. Additionally, in situations where an individual spends a significant amount of time traveling, it becomes even more difficult to provide certain advantages, such as PBX-based telecommunication features as are found in most conventional office environments. A private branch exchange (PBX) switch is commonly known in the art as a system useful in providing certain calling features such as abbreviated dialing, call transfer, hold, mute, and others, within an office complex served by the PBX switch. One exemplary PBX switch is the Definity™ switch sold by Lucent Technologies.

A PBX switch may be located "on site" as customer premise equipment —CPE—(one example of CPE being the Definity switch sold by Lucent) or located within the communications network and used by one or more different customers. An exemplary network-based PBX is disclosed in U.S. Pat. No. 5,742,596 issued to Y. Baratz et al. on Apr. 21, 1998. With a network-based PBX, the various office locations may be referred to as "remote" in the sense that the physical office locations need to establish a link with the network-based PBX to obtain the desired functionality. The office stations themselves, however, are equipped with the traditional PBX station set equipment. The actual location of the PBX switch, therefore, is of no concern to the office worker.

In some situations, "telecommuters" have incurred the expense of adding an additional phone line, or ISDN, to handle the increase in telephony traffic associated with working at home. While this solution is acceptable in some situations, it quickly becomes an expensive alternative for the employer. Further, the "traveling" employee has no "home office" within which to install such equipment, remaining disadvantaged with respect to the personnel at a traditional work location. Indeed, the technology deployed at the home office may "lag" the latest PBX-based innovations found in the office.

Thus, a need remains for an arrangement capable of emulating features such as those found on a standard PBX for "remote workers" such as the telecommuting employee or the traveling employee.

SUMMARY OF THE INVENTION

The need remaining in the prior art is addressed by the present invention, which relates to method and system for providing enhanced call service features at remote locations and, more particularly, to method and system for providing PBX-like functionality at any away-from-the-office location.

In accordance with the present invention, an individual at a location "remote" from the office may now have "PBX-like" capabilities, with all communications being controlled by a remote office platform, linked to the remote worker. In particular, the remote office platform is linked to the office PBX system. Features such as abbreviated dialing for in-house calls, call forwarding, call transfer, hold, three-way calling, secretarial pick-up, and more, are provided at a remote location where an individual can connect to the remote platform and have a user interface display available. The graphical user interface (GUI), in a preferred embodiment, is a "soft phone", displaying a PBX station-like set-up including a handset, call feature buttons, a message center, and the like.

The system of the present invention uses a remote office platform that communicates with both the office PBX and a data network coupled to the remote office location. The remote office platform includes the software necessary to "push" the GUI to the remote device and also comprises a database including necessary information regarding each employee permitted to access the "virtual PBX" system. Once activated by a remote worker, the remote office platform communicates with the office PBX so as to communicate all PBX-based requests from the remote location back to the office PBX. In the other direction, all incoming calls to the remote worker's PBX extension are forwarded by the PBX to the remote office platform and, ultimately, to the remote location. The term "office PBX" as used throughout this discussion is considered to include a customer-premise PBX, a network-based PBX (perhaps being shared by a number of different subscribers), or any other suitable PBX architecture.

In operation of the method of the present invention, a remote worker first dials in to the remote office platform and is authenticated. Voice connectivity between the office PBX and remote worker can be provided over whatever telephony connection exists at the remote location (POTS over PSTN, cable, fixed wireless, among others). Data connectivity, used both for "pushing" the GUI interface and transferring all call requests between the remote worker and the remote office platform, may be provided by any suitable data network including, but not limited to, the internet. Ultimately and with the advance of IP telephony, only a single communications network will be needed to support both the voice and data traffic. Since the "remote" worker may be at any location, the system of the present invention is equally applicable in an international environment, where the "remote" worker may be in another country and access the remote office platform via an international connection.

Other and further features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
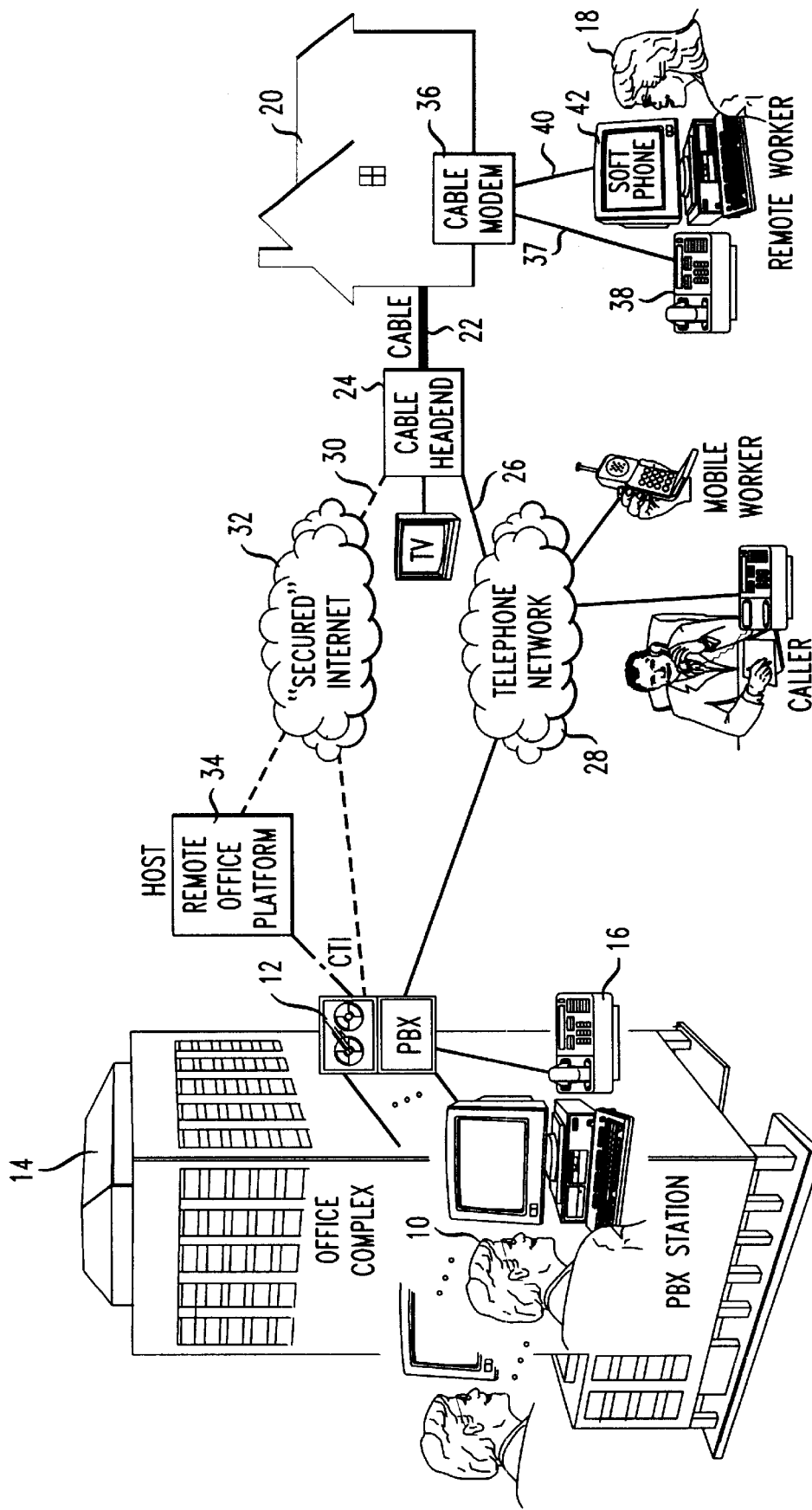
FIG. 1 is a conceptual "virtual PBX" system of the present invention.

FIG. 1 illustrates a high-level conceptual: implementation of the "virtual PBX" system of the present invention. A traditional office environment is shown as including a plurality of stations 10 coupled to a PBX 12 within an office complex 14. Each station 10 includes a telephone 16 with conventional PBX features such as call forwarding, mute, hold, transfer, etc. As discussed above, an increasing number of workers may spend a portion of the work week at locations other than the office. These workers may be "telecommuters" (working at home or another fixed location) or traveling with no fixed location. In accordance with the present invention, these workers can now have a "virtual PBX station" using a voice network and data network to connect the worker, via a remote office platform, with the PBX in the office (or network, as the case may be). Throughout the remainder of this discussion, the term "remote worker" will be used and is considered to encompass the traditional "telecommuter" working at a home office, a "field employee" temporarily at a company location other than their usual office, "traveling" employees at a client site, hotel or any other facility. In general, an individual working from any location with at least voice telephone access and, preferably, modem access to a data network is considered to fall within the definition of a "remote worker" in accordance with the principles of the present invention.

Referring to FIG. 1, an exemplary remote worker 18 is shown as a "telecommuter" within a home environment 20. In the embodiment illustrated in FIG. 1, a cable connection 22 is used to provide all communication access to home 20. Other embodiments, using a conventional modem, are also possible and as such require separate voice and data connections into the home (a "two-line" solution). Ultimately, a "one line" arrangement, supporting Ip telephony over a data network is a preferred system for deploying the features of the present invention. For present purposes however, any arrangement capable of providing both voice and data communication with the remote location are acceptable and, at the present time, a cable connection 22 to a cable modem 36 as depicted in FIG. 1 is preferable. At a cable headend 24 as shown in FIG. 1, a voice connection 26 is made to a voice network 28 and a data connection 30 is made to a data network 32. In an exemplary embodiment, voice network 28 may be the PSTN and data network 32 may be the Internet. Other network connections may be used and all are contemplated to fall within the scope of the present invention. A remote office platform 34, also shown in FIG. 1, is the critical element of the inventive system and is in communication with both data network 32 office PBX switch 12. In particular, remote office platform 34 is used to control the communication between office PBX 12 and remote worker 18 so as to provide the PBX-like features at the remote worker's location. Home environment 20 is depicted as including a cable modem 36 that allows for a "two-line" communication between remote worker 18 and voice/data networks 28,32. In particular, a first line 37 is coupled to a remote worker station set 38 and a second line 40 is coupled to a remote worker endpoint terminal 42.

Figure 2:
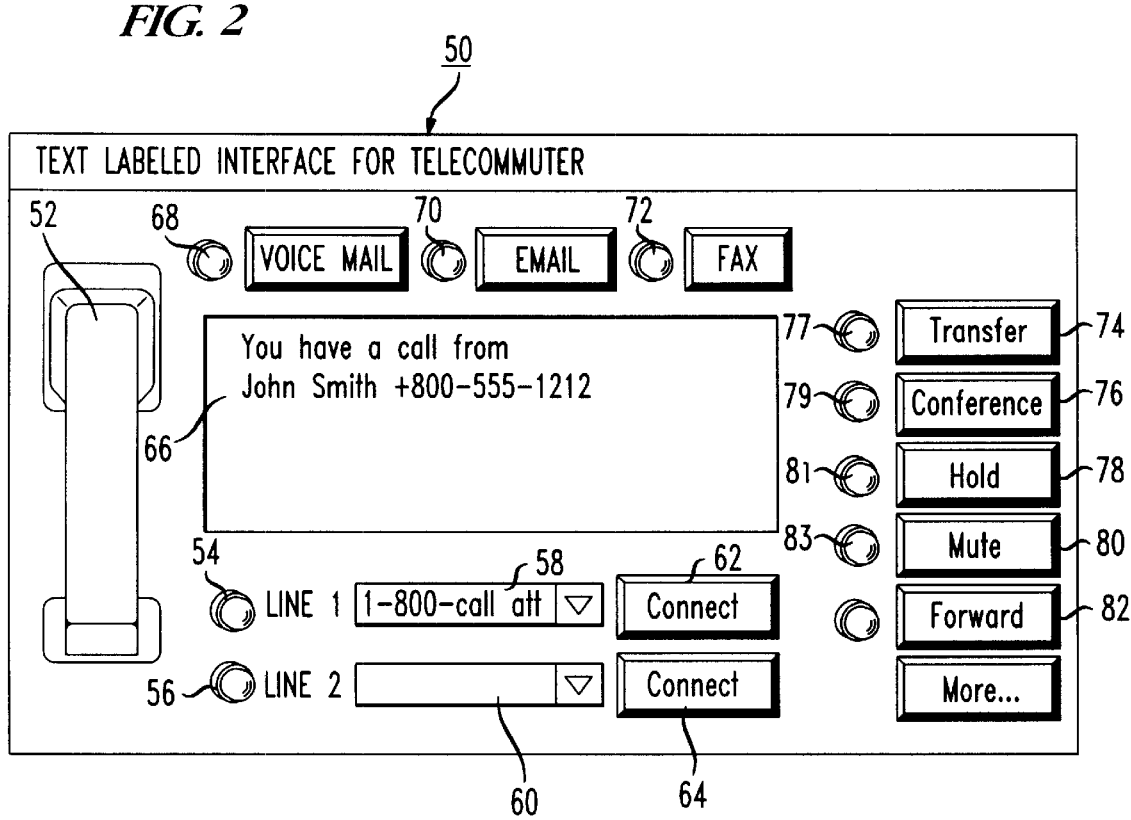
FIG. 2 illustrates a typical "soft phone" GUI that may be used by a remote worker implementing the virtual PBX system of the present invention.

As will be discussed in detail below in association with FIGS. 2 and 3, remote worker 18 initiates the "virtual PBX station" environment by logging in, via endpoint terminal 42, to remote office platform 34. Platform 34 performs security checks to authenticate remote worker 18, then sends a control message to PBX 12, via data network 32. The authentication may take place across an IP virtual private network (VPN), including the use of both a login and password. Thus, only "authorized" individuals will access the IP VPN, and the VPN will perform, the necessary follow-up procedures to grant login permission to the remote worker. Once the remote worker receives permission to enter the "virtual PBX station" system, platform 34 will send a message to PBX 12, indicating that platform 34 will handle all call flows associated with the remote worker's office extension. In particular, the "control message" prompts PBX 12 to "forward" all calls to/from remote worker's office extension directly to platform 34 for call control. Once remote worker 18 is authenticated, platform 34 transmits to remote endpoint terminal 42 (in this case, a PC), via data network 32, a "soft phone" interface so as create a "virtual PBX" at home environment 20. Various call flows, both into and out of home environment 20, will be discussed below in association with FIGS. 2 and 3. In general, remote office platform 34 is used to emulate the PBX environment on the remote endpoint terminal and functions to communicate between PBX 12 and endpoint terminal 42 to control all communication. Importantly, therefore, the PBX station emulation (i.e., user interface) is downloaded only after the remote worker is authenticated; the emulation is not resident in any endpoint terminal device.

With the arrangement as shown in FIG. 1, a remote worker will be able to receive calls placed to them at their "office" number, regardless of the remote worker's current location. Additionally, the remote worker will be able to make outbound calls, via office PBX 12, using the "soft phone" interface on endpoint terminal 42. An exemplary "soft phone" display 50 is illustrated in FIG. 2, and illustrates some of the various PBX station-type functionalities available for the remote worker. A graphical handset 52 is included and may be activated to go "off-hook" by a mouse "click"—either to answer an incoming "soft phone" call (forwarded from the office PBX) or place an outbound "soft phone call (to be forwarded to the office PBX for completion). Display 50 may also include a sea of line indicators, in this example, a pair of line indicators 54 and 56 (showing that two separate "soft phone" lines are coming into endpoint terminal 42), where the indicators will illustrate the presence of an incoming call (by changing color, for example) or the "hold" state of one call while another is being answered (by "blinking", for example). Associated with each line indicator 54,56 may be a separate "speed dial" list, shown by elements 58 and 60 in display 50 of FIG. 2. Speed dial list 58, for example, may be a pull-down menu of a first set of often-called telephone numbers. Speed dial list 60, which may also be a pull-down menu, may include fax numbers, beeper numbers, or any other telecommunication numbers the remote worker needs. Shown in FIG. 2 is a separate "connect" button 62 and 64 for speed dial lists 58 and 60, respectively.

Part of the graphical user interface included within display 50 is a message area 66, which may advantageously provide more information than available at a station directly coupled to a conventional PBX. As shown, in the presence of an incoming call, message area 66 displays a message including caller ID information such as ANI and, perhaps, the name of the calling party. Display 50 may also include "message waiting" lights (as commonly found on station sets served by a PBX), such as message waiting indicators 68, 70 and 72 associated with "voice mail", "email" and "fax" messages. Further as found on PBX-based station sets, display 50 includes a set of buttons associated with various call treatments. Referring to FIG. 2, display 50 includes a transfer button 74, a conference button 76, a hold button 78, a mute button 80 and a forward button 82. A set of display indicators 77, 79, 81 and 83 are associated with these call treatment functions (used to indicate whether or not the various types of call treatment have been activated). For example, if mute button 80 has been activated (such as by a mouse "click"), indicator light 81 will change in appearance as a reminder that the mute function (i.e., suppressing transmission on the return path) has been activated.

An advantage of the "soft phone" virtual PBX of the present invention is that the remote worker may have additional call flexibility beyond that associated with a traditional PBX (such as the speed dial pull-down menus described above). Another extended feature may be the ability to activate additional functionality via a call feature button indicated by "more" button 84 in display 50. Activation of the "more" button may bring up for the remote worker an additional set of call functionality (for example, initiating conference calls, accessing corporate messages, broadcasting messages to all station sets behind the office PBX, etc.). A further advantage resides in the ability to "upgrade" the PBX functionality at the remote location simply by modifying the software in remote platform 34 used to create GUI display 50. For example, if an office PBX system is "upgraded" to include speed dialing, this feature may be added to the remote worker's capabilities at the same time.

In an environment where the remote worker's access to remote office platform 34 is limited to a traditional telephone set (that is, no computer-based data interconnection), the "virtual PBX station" attributes can be provided by using various DTMF tones of a conventional phone to determine call control. In particular, a remote worker may dial in to access the "virtual PBX" system of the present invention, where the dial-in number is associated with remote office platform 34. Platform 34 may include a voice response unit (VRU) 35 which would then prompt the worker to enter certain information, via the telephone keypad, to verify the authentication of the worker. Once verified, remote office platform 34 will reside as an interface between office PBX 12 and the remote worker, as discussed above. The various PBX-like station features may be implemented by a remote worker using a traditional station set via predetermined combinations of DTMF tones, where these tones are recognized by remote office platform 34 and used to send the proper call control messages back to office PBX 12. For example, to transfer a call to another extension within the PBX, the remote worker may depress "#2ABCD" (indicating that the call should be transferred to the four-digit extension ABCD). The software within remote office platform 34 is programmed to recognize receipt of "#2" as a request to transfer a call, and will look for the next four digits to provide the transfer extension. This information will then be sent from remote office platform 34 to office PBX 12, where PBX 12 will perform the actual call transfer function. To forward all incoming calls, the remote worker may depress "#4". When received at remote office platform 34, the DTMF tones associated with "#4" will result in platform 34 sending a "call forward" message to office PBX 12. In a similar fashion, various combinations of DTMF tones may be used to by the remote worker to provide the desired PBX-like features at the remote location.

Figure 3:
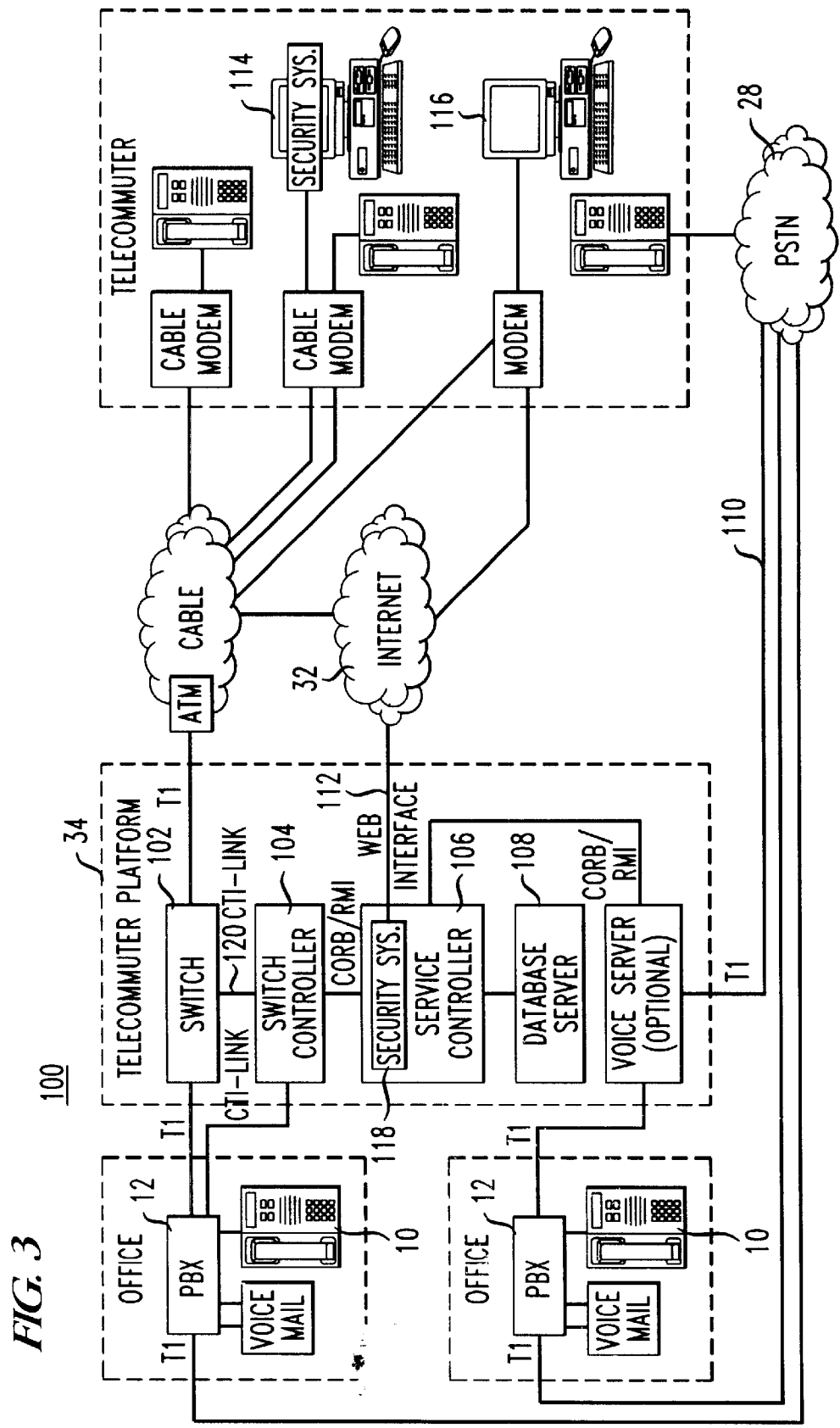
FIG. 3 contains a block diagram of an exemplary "virtual PBX" system of the present invention.

FIG. 3 contains an exemplary "virtual PBX" architecture 100 that may be used in the system of the present invention, illustrating in particular alternative connections between remote workers and an office-based PBX. Common components between architecture 100 of FIG. 3 and conceptual diagram system 10 of FIG. 1 include office station set 10, office PBX 12, voice network 28 and data network 32. Remote office platform 34 is illustrated in detail in FIG. 3, and includes a switch 102, switch controller 104, service controller 106 and database 108. A voice connection 110, such as a T1 line, is shown as coupling voice network 28 to a telephone switch 102. A data connection 112 is shown as coupling data network 32 to service controller 106. Also shown in FIG. 3 are two different types of "remote" workers—(1) a cable modem-based "remote" worker 114, where both voice and data are supplied over a single line (as is the case in the simplified diagram of FIG. 1): and (2) a two-line data and voice remote worker 116, where a conventional modem is used to provide the data connection and a separate voice line, provided over a traditional PSTN for example, is used to handle the voice traffic. As mentioned above, either embodiment (as well as the single-line embodiment capable of supporting IP telephony) is useful in providing the "virtual PBX" functionality of the present invention. It is to be understood that the various components discussed above may or may not comprise physically separate components, but are viewed in these examples as "logically separate" components.

The following discussion will provide details associated with "call flow" to/from a remote worker. As mentioned above, a remote worker must first "log in" to the virtual PBX system of the present invention in order to avail himself of any of the call features discussed above. To log in, a remote worker dials in, via his endpoint terminal (such as PC 42) over data network 32 to a security system 118 within service controller 106. Various security arrangements can be used to authenticate the remote worker and his capability to access the virtual PBX system of the present invention. For example, a personal ID number and password may be used. Other arrangements are possible. Once the remote worker is authenticated, service controller 106 sends a message to switch controller 104, indicating that the control of all telecommunications with the identified remote work are to be passed by PBX 12 to remote platform 34. As a result, PBX 12 will now hand off all call control to remote platform 34 for calls received for the remote worker's identified station 10 within the office (whether the calls originate within the office or outside of the office) and PBX 12 will react based upon instructions from remote platform 34.

As mentioned above, the remote worker's actual location is not necessary for others to know to reach him at his usual office phone number. That is, a caller places a call to the remote worker in the usual fashion, dialing the office phone number associated with the remote worker (for internal calls, abbreviated dialing-in terms of a 4 or 5-digit number may be dialed; for external calls, the traditional 7 or 10-digit number is dialed). PBX 12, upon recognition of the dialed number, will "hand off" the incoming call to remote platform 34 via a CTI link 120 to switch controller 104. The call is then passed to service controller 106 which performs a look-up in database 38 to determine the "reach" number for the remote worker (as controlled by the worker, the "reach" number may be a home phone number, an alternative work location number, a cell phone, or even a hotel phone for a traveling remote worker). Once the reach number is obtained, service controller 106 sends an "incoming call" message to the remote worker's "soft phone" via data network 32. If the remote worker is on another call, they have the option to place the first call on hold (such as by "clicking" the "hold" button 78 on soft phone display 50 of FIG. 2) and take the second call. In reality, when the "hold" button is activated on display 50, a "hold call" message is sent, via data network 32, back to PBX 12 which will, in fact, place the first call on "hold" within PBX 12. If there is no answer or a "busy signal" is encountered at the remote location, remote platform 34 will instruct PBX 12 to forward the call to, for example, a voice messaging system (not shown, but may be included within service controller 106). Upon being notified that a voice message has been recorded, service controller 106 will send an indication to endpoint terminal 42 that a new voice message has been received, resulting in "lighting" the voice mail indicator 68 on soft phone display 50. Obviously, in situations where the endpoint terminal does not include a display device, an alternative type of indication (such as an alternative ring) may be used as the indicator.

The remote worker is also capable of placing outbound calls from endpoint terminal 42, where these calls will ultimately be processed by PBX 12. Therefore, the remote worker may use a speed dialing list (such as one of the pull-down menus 58,60. The request to place the call may be initiated by activating, for example, "connect" button 62 on display 50. The "call connect" message is then sent, via data network 32, to remote platform 34. Service controller 106, in turn, tells switch controller 104 to instruct PBX 12 to place the call. PBX 12 ultimately connects the parties by launching a first call to the remote worker's station and a second call to the called party number, then bridges the calls together. In the "virtual PBX" arrangement of the present invention, therefore, the remote worker's telephone will remain "on hook" for outbound calls until the remote platform calls back to bridge the calls together.

In another feature of the present invention, the virtual PBX environment allows the remote worker to initiate a "chat" session with other workers connected to the PBX (either at the office or themselves at other "remote" locations). That is, the remote worker may initiate a session by entering the other worker's extension (the GUI interface may include a special "chat" icon to initiate this feature). The remote office platform would then translate the entered extension into the electronic address necessary to reach the other worker via the data network. The platform would then form a data connection between the parties to establish the chat session.

While the present invention has been described in connection with the illustrated embodiments, it will be appreciated and understood that modifications may be made without departing from the true spirit and scope of the invention. It is to be understood that the particular embodiments shown and described are by way of illustration and in no way intended to be considered limiting. Therefore, references to details of a particular embodiment are not intended to limit the scope of the claims, which in themselves recite only those features regarded as essential to the invention.

What is claimed is:

1. A method of providing PBX-like functionality at a remote location not directly connected to a PBX switch, the method comprising the steps of:
    a) providing voice and data communication interconnections to voice and data networks at the remote location;
    b) providing a remote office platform coupled between the remote location and the PBX switch;
    c) authenticating, at the remote office platform, access to the PBX switch from the remote location;
    d) downloading an interface of PBX features across the data communication facility from the remote office platform to said remote location to create a virtual PBX system at the remote location;
    e) in response to PBX-like commands received at the remote office platform from said remote location, forwarding said commands to said PBX switch for call completion; and
    f) intercepting, at the remote office platform, calls received at the PBX switch for forwarding to said remote location.

2. The method as defined in claim 1 wherein in performing step a) the voice and data interconnections are provided using a cable modem.

3. The method as defined in claim 1 wherein in performing step a) the voice interconnection is provided directly from the voice communication network and the data interconnection is provided using a modem.

4. The method as defined in claim 1 wherein in performing step a) the voice and data interconnections are provided using a modem and the voice communication comprises IP telephony.

5. The method as defined in claim 1 wherein in performing step c) the remote office platform compares authentication information input by the remote location user to predetermined authentication information stored in a database at the remote office platform.

6. The method as defined in claim 1 wherein in performing step d), the remote office platform transmits the PBX interface across the data network to the remote location.

7. The method as defined in claim 6 wherein in performing step d) the remote office platform transmits a graphical user interface PBX station replica as the PBX interface to the remote location.

8. The method as defined in claim 1 wherein in performing step e), the remote office platform intercepts the PBX-like commands initiated at the remote location and forwards said PBX-like commands to the PBX switch.

9. The method as defined in claim 1 wherein in performing step e), a remote worker initiates a chat session with another worker using the worker's office extension for the PBX-like command sent from the remote worker to the remote office platform.

10. The method as defined in claim 1 wherein in performing step e) a remote worker initiates an outbound call using the following steps:
    1) sending a call request to the remote office platform;
    2) transmitting the call request from the remote office platform to the PBX switch;
    3) establishing, at the PBX, a first call to the called party;
    4) establishing, at the PBX, a second call to the remote worker; and
    5) bridging together the first and second calls established at the PBX.

11. A remote office platform for providing PBX-like functionality at a location not directly connected to an office PBX switch, the remote office system comprising
    a remote office location including voice and data communication network interconnections, said remote office location further comprising a graphical user interface emulating a PBX station set for providing PBX-like call features at said remote location; and
    a remote office platform coupled between the office PBX switch and the remote office data interconnection for transferring an interface of PBX features to the remote office location graphical user interface, receiving PBX-like call feature commands from the remote office location, and forwarding said PBX-like call feature commands to the office PBX switch so as to cause the office PBX switch to provide PBX-like call feature functionality at the remote office location.

12. A remote office system as defined in claim 11 wherein the remote office voice and data interconnections comprise a cable modem.

13. A remote office system as defined in claim 11 wherein the remote office voice interconnection comprises a PSTN connection and the data interconnection comprises a data modem.

14. A remote office system as defined in claim 11 wherein the remote office platform includes an authentication system for checking and approving the eligibility of a user at a remote location to access the office PBX.

15. A remote office system as defined in claim 11 wherein the remote office platform includes a service controller for processing the PBX-like commands received from the remote location and forwarding said PBX-like commands to the office PBX switch.

16. A remote office system as defined in claim 11 wherein the graphical user interface includes a handset icon for activation to initiate and receive telephone calls between the remote location and the office PBX switch.

17. A remote office system as defined in claim 11 wherein the graphical user interface includes a plurality of call handling icon buttons for activating an associated plurality of PBX-like call features.

18. A remote office system as defined in claim 17 wherein the plurality of call handling icon buttons include call transfer, conference call, hold, mute and forward.

19. A remote office system as defined in claim 11 wherein the graphical user interface includes a pull-down speed dialing menu and an associated dialing icon to initiate a call to a selected speed dialing number.

20. A remote office system as defined in claim 11 wherein the graphical user interface includes a message center for displaying information regarding incoming calls forwarded by the remote office platform from the office PBX switch.

21. A remote office system as defined in claim 20 wherein the displayed information includes ANI and caller ID information.

22. A remote office system as defined in claim 11 wherein the graphical user interface includes message waiting indicator icons.

23. A remote office system as defined in claim 22 wherein the message waiting indicator icons includes a voice mail message waiting indicator icon.

24. A remote office system as defined in claim 22 wherein the message waiting indicator icons include an email message waiting indicator icon.

25. A remote office system as defined in claim 22 wherein the message waiting indicator icons include a fax message waiting indicator icon.

* * * * *